Figure 1:
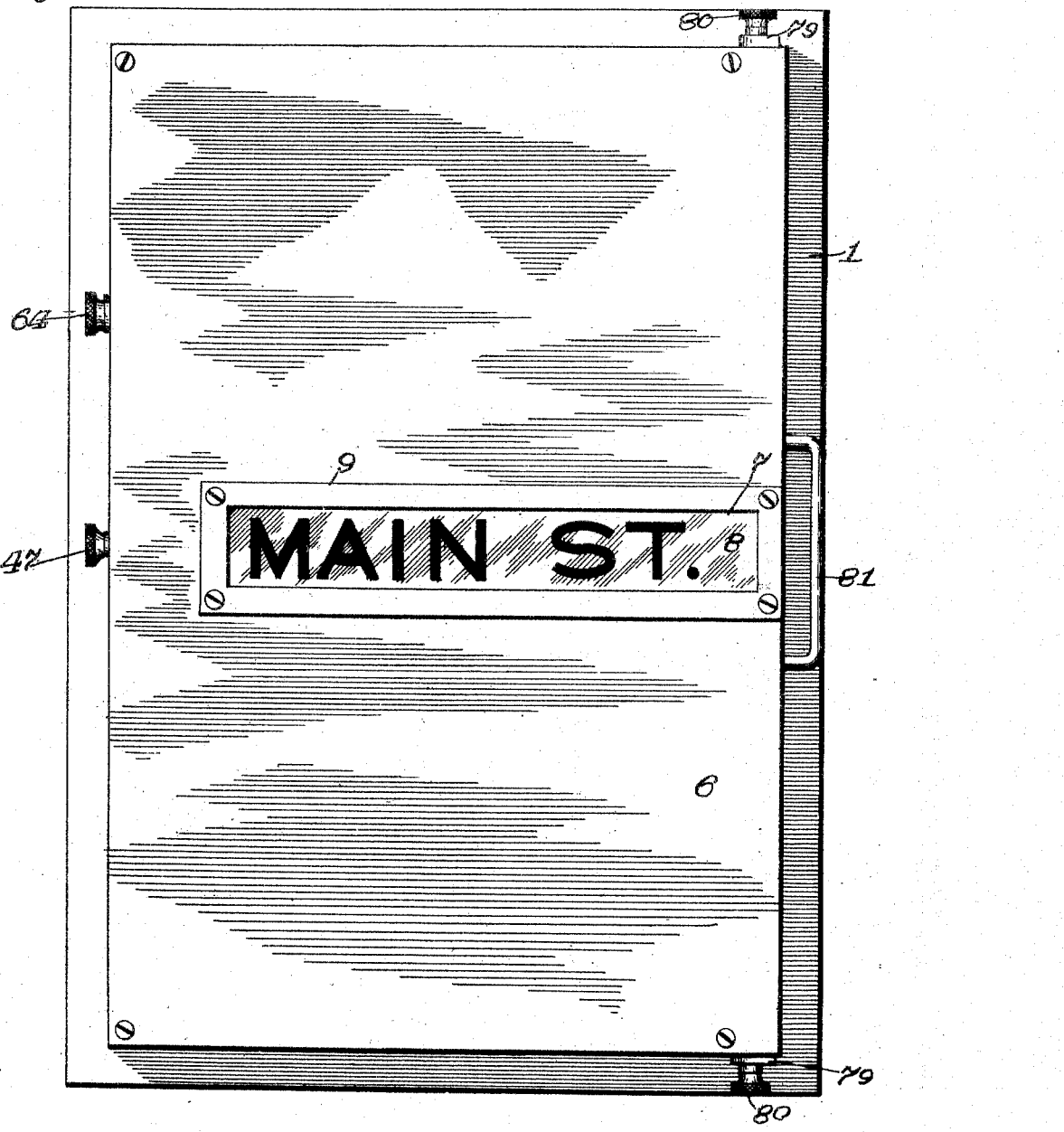

No. 777,254. PATENTED DEC. 13, 1904.
C. E. HAWKINS & F. CARY.
INDICATOR.
APPLICATION FILED JULY 18, 1903.
NO MODEL. 6 SHEETS—SHEET 1.

Witnesses:
Geo. B. Rowley,
E. E. Potter.

Inventors
Chas. E. Hawkins
Frank Cary,
By H. C. Everitt
Attorneys.

No. 777,254. PATENTED DEC. 13, 1904.
C. E. HAWKINS & F. CARY.
INDICATOR.
APPLICATION FILED JULY 18, 1903.
NO MODEL. 6 SHEETS—SHEET 2.

Witnesses:
Geo. B. Rowley
E. E. Potter

Inventors:
Cha's. E. Hawkins,
Frank Cary.
By N. C. Everett
Attorneys.

No. 777,254. PATENTED DEC. 13, 1904.
C. E. HAWKINS & F. CARY.
INDICATOR.
APPLICATION FILED JULY 18, 1903.
NO MODEL. 6 SHEETS—SHEET 3.
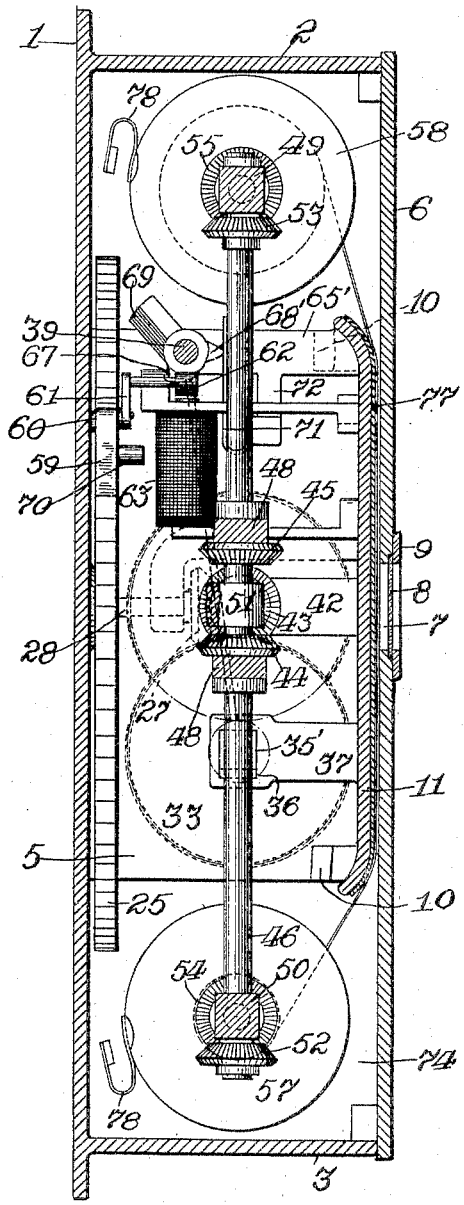
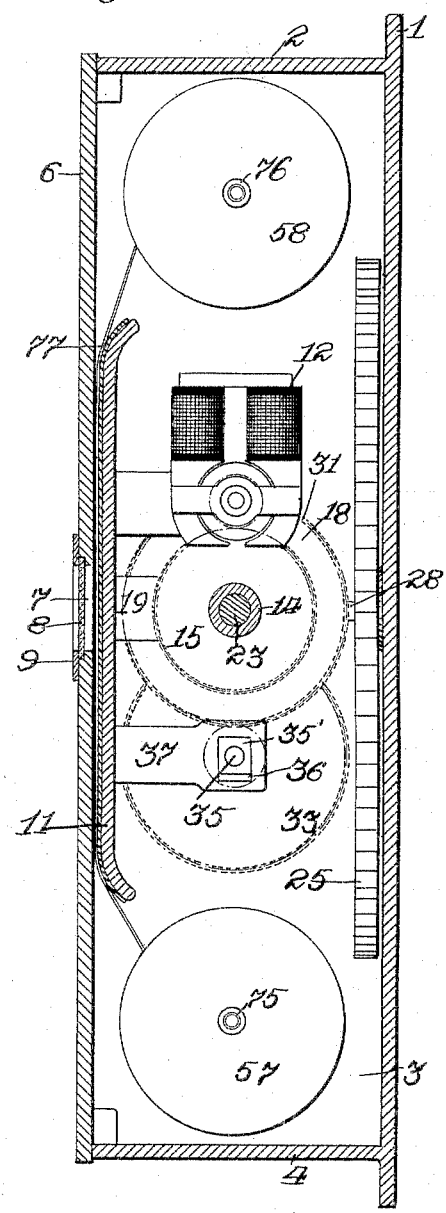
Witnesses:
Geo. B Rowley
E. E. Potter
Inventors;
Cha's. E. Hawkins.
Frank Cary
By N. C. Evert ho.
Attorneys.

No. 777,254. PATENTED DEC. 13, 1904.
C. E. HAWKINS & F. CARY.
INDICATOR.
APPLICATION FILED JULY 18, 1903.
NO MODEL. 6 SHEETS—SHEET 4.
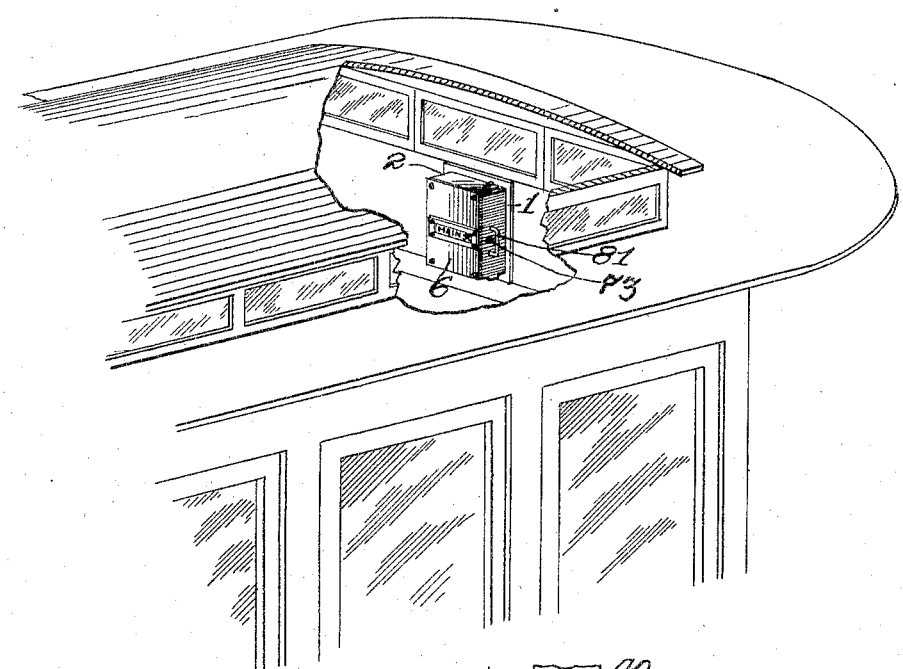
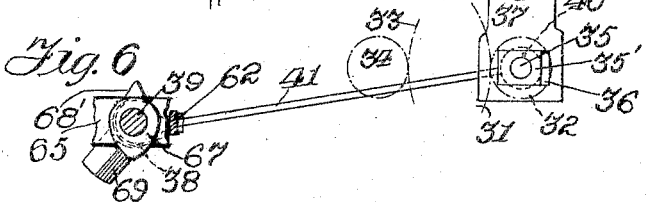
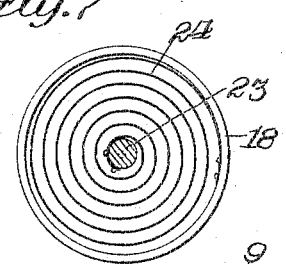
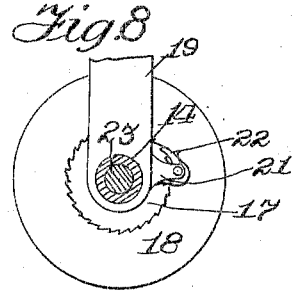
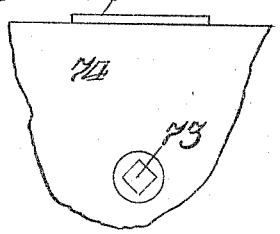
Witnesses:
Geo B Rowley
E. E. Potter
Inventors;
Chas. E. Hawkins.
Frank Cary
By H.C. Evert Ho.
Attorneys.

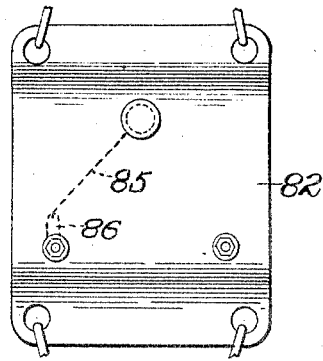
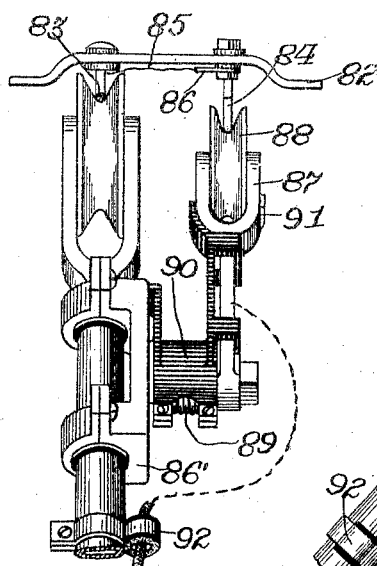
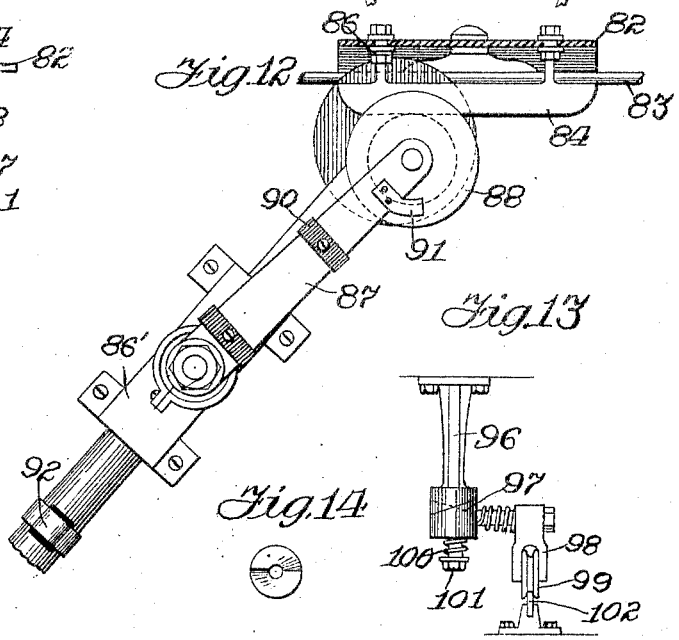
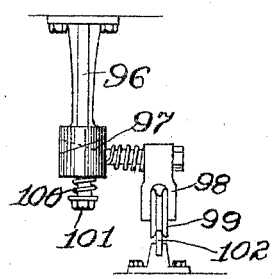
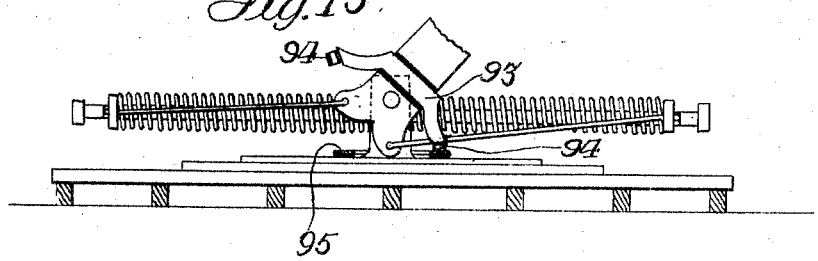

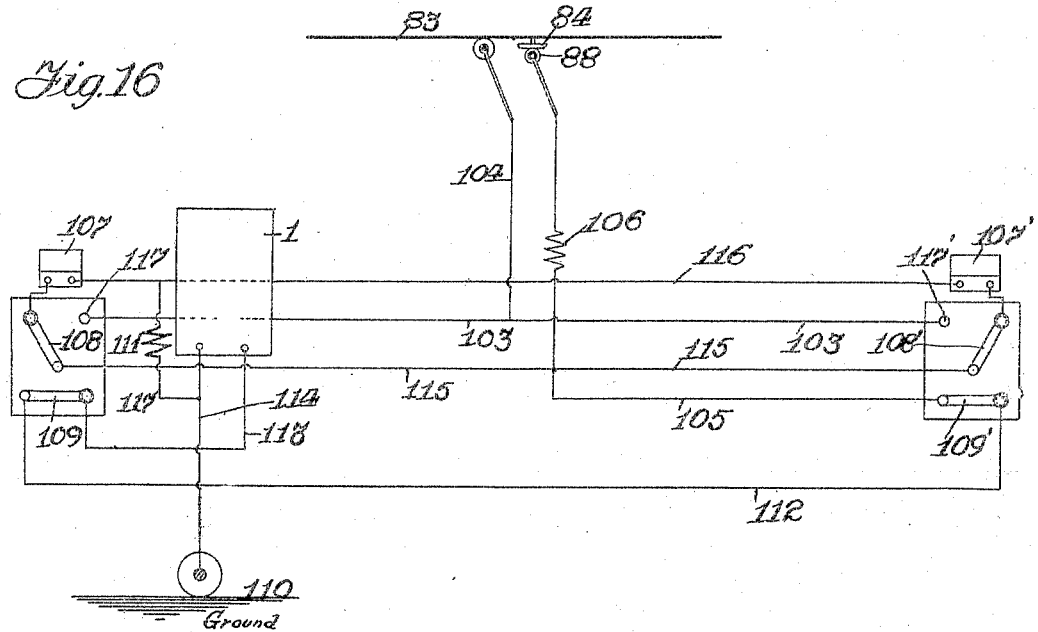
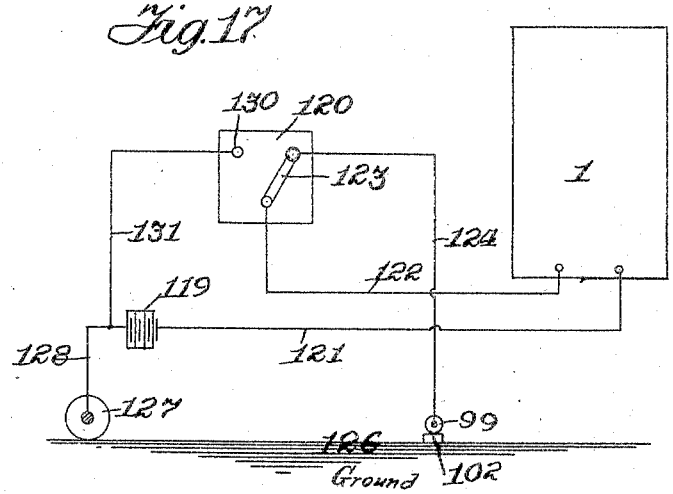

No. 777,254. Patented December 13, 1904.

UNITED STATES PATENT OFFICE.

CHARLES E. HAWKINS, OF BRADDOCK, AND FRANK CARY, OF WILKINSBURG, PENNSYLVANIA.

INDICATOR.

SPECIFICATION forming part of Letters Patent No. 777,254, dated December 13, 1904.

Application filed July 18, 1903. Serial No. 166,101. (No model.)

*To all whom it may concern:*

Be it known that we, CHARLES E. HAWKINS, residing at Braddock, and FRANK CARY, residing at Wilkinsburg, in the county of Allegheny and State of Pennsylvania, citizens of the United States of America, have invented certain new and useful Improvements in Indicators, of which the following is a specification, reference being had therein to the accompanying drawings.

This invention relates to certain new and useful improvements in indicators, and relates more specifically to an indicator adapted for use in connection with street-cars and railway-cars for indicating the succeeding street or station.

The object of the present invention is to construct an indicator of this type in which the apron or belt carrying the names of the streets or stations may be readily reversed and returned to its starting position without requiring the travel of the belt or apron to its full extent.

A further object of this invention is in this connection to construct an indicator in which the apron or belt may be readily and easily removed and a different apron or belt readily placed in position when it is desired to change the car from one line to another.

Another object of the invention is to provide means for electrically actuating the operating mechanism of the belt or apron and rewinding the spring of the operating mechanism during each actuation of the belt or apron.

A still further object of the present invention is to provide novel reversing mechanism whereby the belt may be caused to travel in either direction, and, further, to provide for the feeding of the belt an equal distance on each actuation thereon irrespective of the increased diameter of the spool receiving the apron or belt as the latter is wound thereon.

Various other objects enter into the present invention and will be hereinafter more specifically described and then particularly pointed out in the appended claims, and in describing the invention in detail reference will be had to the accompanying drawings, forming a part of this application, and wherein like numerals will be employed for designating like parts throughout the different views, in which—

Figure 2:
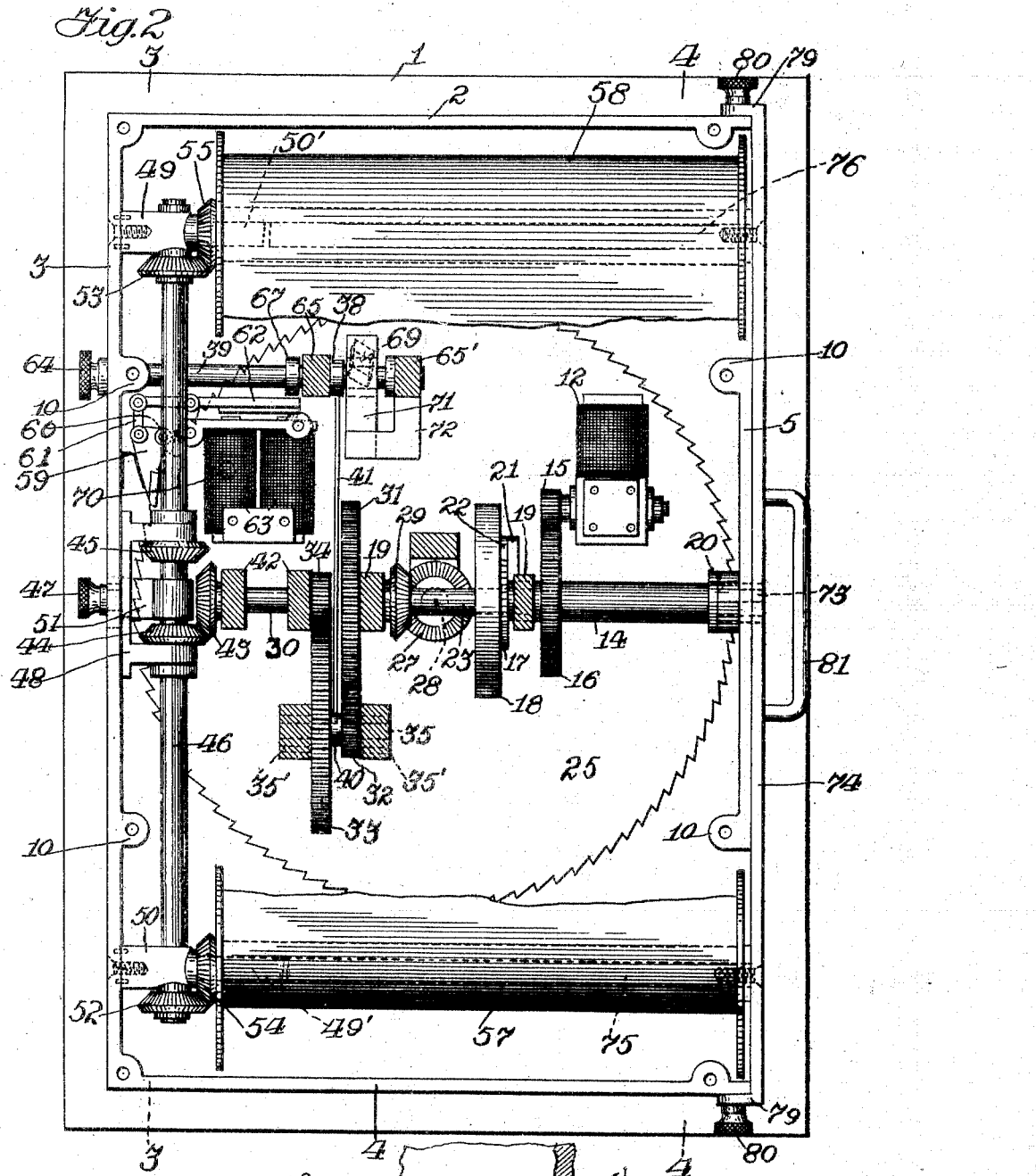
Figure 18:
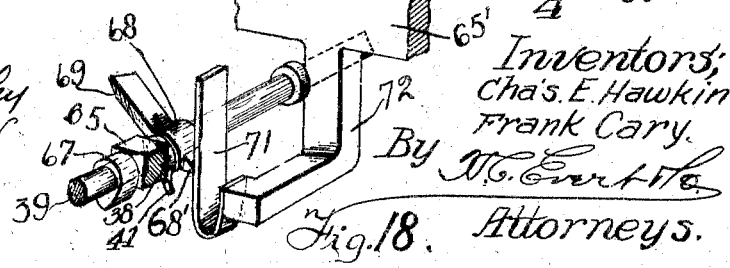

Figure 1 is a front elevation of our improved indicator. Fig. 2 is a front elevation of the indicator with the front plate removed, the belt or apron partly broken away, and its retaining-plate removed, showing parts in section. Fig. 3 is a transverse vertical sectional view of the indicator, taken on the line 3 3 of Fig. 2. Fig. 4 is a like view taken on the line 4 4 of Fig. 2. Fig. 5 is a detail perspective view of the indicator in position in a car, the latter being broken away. Fig. 6 is a detail view of the mechanism for disengaging the apron or belt from the operating mechanism, whereby the belt or apron will be returned to its initial or normal position. Fig. 7 is a detail view of the winding-spring and its case. Fig. 8 is an elevation of the spring-case, showing the winding-ratchet, the shaft being shown in cross-section. Fig. 9 is an edge view of a part of the indicator-mechanism case, showing the end of the shaft for the initial winding of the mechanism. Fig. 10 is a detail front elevation of the contact-trolley. Fig. 11 is a detail plan view of the hanger-plate that carries the contact to complete the circuit to the mechanism. Fig. 12 is a side elevation of the contact-trolley, showing the hanger-plate in section. Figs. 13 and 14 are detail views of a form of trolley-contact employed when the device is used in connection with steam or third-rail systems. Fig. 15 is a detail view showing the contact employed at the foot of the trolley-pole when the device is used in connection with overhead-trolley systems. Fig. 16 is a diagrammatical view of the circuit of the device when used in connection with overhead-trolley lines. Fig. 17 is a like view of the circuit when the device is used in connection with steam-operated railways or with third-rail electric systems. Fig. 18 is a fragmentary detail view in perspective of the mechanism employed for actuating the means to permit reversal of the belt.

Briefly described, our invention consists in providing a strip of flexible material the ends of which are secured to suitable rolls, and the names of the streets or stations comprising the route in connection with which this set of rolls is to be used are provided upon the face of said roll in any suitable manner. These rolls are pivotally mounted on an end of the casing which is removable, and when the rolls are in position within the casing they are connected with suitable driving means, which is preferably a spring which is continually wound by a motor, said motor receiving power from the indicator-actuating circuit at the intervals at which said circuit is completed. In order to prevent this spring from turning the rolls at all times, a notched disk is connected with said driving mechanism, and a dog is provided which normally engages one of said notches; but when it is desired to move the strip a set of magnets temporarily disengage the dog from the disk for the purpose of permitting the driving mechanism to operate. We also provide means whereby the driving mechanism may be disconnected from the rolls in order that the rolls may be restored to any desired position at any time. Reversing mechanism is also provided in the roll-driving mechanism whereby the direction of rotation of said rolls may be reversed, and in order to have the rolls feed properly, irrespective of the amount of the strip wound thereon, the notches in the disk are gradually decreased in size, whereby to compensate for this unequal peripheral travel of the material on the roll.

Referring to the drawings, the reference-numeral 1 indicates a main casing, which has the walls 2, 3, and 4 provided on three of its sides and preferably formed integral therewith, and the wall 5 on the remaining side is so constructed that rolls upon which the indicating-strip is mounted may pass into said casing. The casing is closed by a lid 6, which is removable, and a sight 7 is formed in said lid, the same being closed by a piece of glass or other transparent material 8, which is held in place by the part 9, which is secured to said cover. On the sides 3 and 5 lugs 10 are provided, and the bridge member 11, upon the under side of which the bearings for most of the operating parts are formed or secured, rests on and is fastened to the lugs 10. The motor 12 is suitably secured on this part 11 and is connected with a sleeve 14 by the gears 15 and 16. This sleeve 14 has secured on its forward end the ratchet-wheel 17, this wheel being formed with or having a drum 18 secured thereon. The sleeve 14 operates in the bearings 19 and 20, and secured to the projection 21 of the bearing 19 is a spring-pressed pawl 22 for the purpose of preventing the drum turning in a reverse direction. Passing through said drum and having a bearing on one end within the sleeve 14 is a shaft 23, and a spring 24 is connected between said shaft and the drum 18, whereby when the shaft 23 is prevented from rotating and the drum 18 is moved around said shaft the spring connecting the two will be wound up, thereby insuring a sufficient power at all times to drive the said shaft 23, which is connected with the operating mechanism, as will be hereinafter more fully described. A notched disk 25 is mounted horizontally at the back of the casing, and a gear 27, secured to the shaft 28, which is connected with the disk 26, meshes with the gear 29, which is secured on the shaft 23. It will thus be seen that the rotation of the shaft 28 would necessarily rotate disk 25 correspondingly. A train of back gearing connects the shaft 23 with the shaft 30, the gearing being as follows: A gear 31, which is secured to the shaft 23, normally meshes with the gear 32, which is secured to the gear 33, said gear 33 meshing with gear 34 on said shaft 30. The shaft 35, upon which the gears 32 33 are mounted, is journaled in boxes 35', which are adapted to slide in suitable apertures 36 36, formed in the bearings 37, which are secured to the under side of the plate 11. An eccentric 38 is provided on the shaft 39, the purpose and operation of which will be hereinafter more fully described, and the said eccentric is connected with a bushing 40 on the shaft 35 by a rod 41. It will thus be seen that the actuation of the eccentric 38 will throw gears 32 33 in or out of mesh with the gears 31 34.

The shaft 30, to which the gear 34 is secured, operates in the bearings 42, which are secured to the under side of the plate 11 and has on its forward end the miter-gear 43. The one or the other of the gears 44 45, which are connected to the shaft 46 by a feather connection, is adapted to be in mesh with gear 43. The position of the gears 44 45 is controlled by the thumb-nut 47, which is connected with and is adapted to lock the yoke 48, with which the gears 44 45 are rotatably connected. The shaft 46 has a bearing at either end in the lugs 49 50, and a bearing 51 at the center is provided. Secured to the shaft 46 adjacent to the ends are the gears 52 53, which mesh with the gears 54 55, which are mounted on the bearing-pins 49' 50', said pins projecting through to the rear of these gears 54 55, and when the indicator-rolls 57 58 are in place the said pins project within said rolls in any desirable manner for the purpose of rotating the same when the said gears are turned. From the foregoing description it will be readily seen how the rolls are actuated in one direction or the other by the motor 12 and spring 24.

The means for holding the rolls, except when it is desired to actuate the same, consists of a spring-pressed dog 59, the said dog being pivotally mounted on the lug 60, formed on the back of the casing and having connected to it through the link 61 the armature 62 of the actuating-magnets 63. The dog 59 normally engages one of the teeth of the disk 25, thereby by means of the gear 27, which meshes with the gear 29, preventing the actuating mechanism from operating; but when said magnets 63 are momentarily energized the dog 59 is withdrawn from engagement with the disk and the said disk will revolve until the dog has been forced into the next tooth of the disk 25. As these teeth determine the distance which the rolls will be permitted to revolve, it is obvious that as the rolls get larger a less rotation thereof will be necessary to bring the street or station back of the sight 7, and to compensate for this the teeth are gradually lessened in length around the disk in order that less feed of the strip will be permitted. In order that the machine may be restored to its normal starting position at any time during the travel of the strip, we provide a thumb-nut 64, which is secured to the shaft 39, which is mounted in bearings 65 and 65', the eccentric 38 being mounted on this shaft, as before described. Located adjacent to the bearing 65 is a cam 67, which is adapted when the shaft is revolved in a predetermined direction to contact with the armature 62, forcing the same toward the coils, and thereby withdrawing the dog 59 from the disk 25. A spring-pressed member 68 is also secured on this shaft, and a projection of said member has an angularly-inclined face 69, and a pin 70, carried by the disk 25, is adapted to hit the same when the disk is in a predetermined or starting position. A spring 71 is secured to the projection 72 of the bearing 65' for the purpose of holding the projection 69 of the part 68 in one of its two positions. The part 68 has a lug 68', with which spring 71 engages. The eccentric 38 also being on this shaft operates in connection with the cam 67 and projection 69, the purpose of which will now be described.

The machine having been set up and a strip lettered to correspond with the route on which the car is to go being placed in position the apparatus is ready for actuation, and upon passing the streets or stations the mechanism, which will be hereinafter fully described, sends an electrical current of momentary duration through the magnets 63 and motor 12, thereby permitting the disk 25 to revolve one tooth by the said magnets withdrawing the dog from the disk and winding up the driving-spring 24. In case when part of the route is covered it is desired to return the disk to its first position the handle 64 of the shaft 39 is revolved, whereby the cam 67 actuates the armature 62, the eccentric 38 forcing the gears 33 32 out of mesh with gears 31 34, thereby disconnecting the gearings between the driving means of the roll-actuating mechanism, and the dog 59 thereby being disengaged from disk 25 the said disk will rotate until such time as the pin 70 has contacted with the projection of the part 68, whereby the shaft 39 is rotated to its former position, and the eccentric 38 and cam 67 are so moved that they will permit the restoration of the parts before mentioned in connection therewith.

In starting the machine it is necessary to give the spring 24 an initial winding by hand, and this is accomplished by the squared end 73 of the sleeve 14, which projects through the wall 5 and roll-holder 74 to the exterior of the apparatus, as indicated in the detail view of Fig. 9. The roll-holder 74 has secured thereto the stationary shafts 75 76, upon which the rolls 57 58 are adapted to rotate, and a thin metallic plate 77 is connected to said roll-holder 74 in such a manner that it may slide over part 11 when the rolls are being placed in the machine, the strip lying over plate 77, thereby preventing the tearing or displacement of said strip when being placed in position. Friction-springs 78 are provided on said roll-holder 74, the said springs bearing against the flange on the spools upon which the strip is mounted, thereby preventing any undue unwinding when the machine is in operation. The roll-holder 74 has L-shaped ends 79, in which the set-screws 80 are placed, and the said L-shaped ends 79 pass over the outside of the parts 2 and 4 of the casing, thereby providing means for securing said ends 74 in position. The handle 81 is placed on the roll-holder 74 for the purpose of permitting the operator to easily withdraw the same, if so desired.

We have designed this indicator with a view to using it on any type of road. Fig. 5, however, shows the indicator in the desirable position within a street-car, although the same could be placed at any other point.

The mechanism used in the electrical circuit for actuating the indicator will now be described.

In the case of trolley-roads the hanger, such as illustrated in Figs. 10, 11, and 12, may be used at the points at which it is desired to actuate the indicator, the said hanger 82 being suitably supported by wires and having connected therewith by the insulated joint the usual trolley-wire 83 and indicating-contact 84, the said contact 84 being connected with the trolley-wire 83 by the wire 85, which is secured to the clip 86 on said contact. The usual trolley wheel, harp, and pole may be used, and clamped thereon and insulated therefrom is the bracket 86, which has rotatably mounted thereon the auxiliary harp 87, which carries the auxiliary trolley-wheel 88. This wheel is normally held in the elevated position by the coil-spring 89, one end of which is secured to said bracket 86, and the other end is secured to the harp 87, and an insulated part 90 incloses said spring and provides a means whereby the trolley-wire cannot come in contact with the indicating-circuit by the slipping off or accidental displacement of the usual trolley-wheel. A brush 91 collects the current from the wheel 88, from whence it is carried from any suitable point by the wire, which is dotted in Fig. 10, to the insulating-brackets 92, which are placed at suitable intervals throughout the length of the pole, the said wire at its bottom connecting with the insulated brush-holder 93, secured to the ends of which are brushes 94, one of which is adapted when the trolley-wheels are in the operative position to contact with the insulated ring 95, from which a wire leads to the indicator through magnets 63 and motor 12 by any suitable connection to the ground. It will be seen that this forms an effectual means for connecting the current and actuating the indicator, and by the arrangement as shown in the case of a single-track road the side of the wire at which the contact 84 is placed will determine whether the trolley-wheel 88 passing said point will connect with said contact or not, this forming a means whereby the point at which the indicator will be actuated may be effectually regulated. In the case of third-rail or steam railroads we provide a device such as illustrated in Fig. 13, the bracket 96 being secured underneath the car and the lower face being formed half and half at reverse angles, as indicated, the block 97, to which the roll-holder 98, carrying the roll 99, is yieldingly connected, having its face similarly cut, said faces being normally held against each other by a spring 100, which is mounted on the stud 101, which passes through block 97 and is secured within the block of the bracket 96. A contact-bar 102 is suitably placed adjacent to the track, whereby the circuit may be completed, and in reversing the car the said block 97 may be given a partial rotation, whereby to throw the contact-roller 99 to the other side of the bracket, whereby it will connect with another set of contacts. (Not shown.) It will be noted that the part 98 being yieldingly connected to the block 97 will prevent any chances of jarring or breaking the parts when the roll 99 passes over the contact.

In Fig. 16 is illustrated a wiring diagram showing the method of connecting up the indicator, the trolley-wire 83 having the usual trolley wheel and rod connected to the wire 103 by the wire 104 and the indicating trolley-wheel 88 being connected to the wire 105 through resistance 106, as shown, and wheel 88 is on the contact 84.

In order to provide means whereby the actuation of the indicator will give either audible or visible signals, we provide a lamp or buzzer, which are shown as the buzzers 107 107', which may be suitably located on the car, preferably adjacent to either platform thereof. The three-way switches 108 108' are provided, and circuit-breaking switches 109 109' are also provided with the circuit. The indicator 1 has a connection to the ground 110, and the switch shown in the diagram being in an operative position the indicating-current will come from wheel 88 through resistance 106, wire 105, switch 109', wire 112, switch 109, wire 113, through the indicator and to the wire 114 and ground 110. It will be noted that wire 105 is connected with the wire 115 between the resistance 106 and switch 109', and the current will pass in either direction on the wires 115 to switches 108 108', through buzzers or lights 107 107', through wire 116, through resistance 111 to the wire 117, which is connected to the wire 114, which leads to the ground. It will thus be seen that the current will pass both through the indicator and the buzzers or lights, thereby actuating the indicator and giving the desired signal. Should for any reason the circuit fail to be completed at the street or station at which it was desired to actuate the indicator, the operator may by throwing the switch 108 or 108' to the contact 117 117' permit the circuit from wire 104 to be conducted through wires 103 to the contacts 117 117', through the switches 108 108' to the wire 115, to the wire 105, through switch 109, through wire 112, through switch 109' to the wire 113, which leads to the indicator and would actuate the same. Where it is desired for any reason to back the car, by opening one of the switches 109 109' the indicating-circuit will be broken, whereby the indicator would not be falsely actuated, as would otherwise be the case. In the case of a steam-road I provide a battery 119 on the train at any desired point, and the three-way switch 120 being in position, as shown, the current will pass from said battery 119 through wire 121, through the indicator 1, through wire 122, switch 123, wire 124, to the contact-roller 99, and when said roller is on the contact, as shown, the current would pass through said contact 102 to the ground 126, through the wheel 127 back to the battery 119 to the wire 128. If for any reason the indicator is not properly actuated, the operator can by throwing switch 123 onto the contact 130 complete the circuit through the indicator by means of the current passing through the battery 119, through wire 121, indicator 1, wire 122, switch 123, contact 130, wire 131, back to the battery. It is obvious that the buzzer could be placed in this circuit and the same could be extended, whereby as many indicators as desired would be within the circuit, as would be the case in a train or trolley-car trailer without making any material change.

While we have herein fully described our apparatus and the electrical connections used in actuating the same, it will be obvious that various changes may be made in the same without departing from the general spirit of our invention.

Having fully described our invention, what we claim as new, and desire to secure by Letters Patent, is—

1. In an indicator, a belt, with means for driving the belt, and means for retaining the belt in predetermined position, means for rendering inoperative said last-named means during reversal of the belt movement, and means for automatically releasing said means upon completion of the belt reversal.

2. In an indicator, a belt, electrically-actuated means for operating said belt, means for retaining said belt in a predetermined position, and means for simultaneously disengaging said last-named and said belt-operating means to permit reversal of the belt movement.

3. In an indicator, a belt, a toothed disk with means for actuating the same, means for retaining the disk in predetermined position, means for intermittently releasing said last-named means to permit revolution of the disk, means for rendering inoperative said last-named means during reversal of the belt, and means actuated by the disk upon completion of the revolution thereof for releasing said means for rendering the disk-retaining means inoperative.

4. In an indicator, a belt, a toothed disk, means for operating the disk, means for retaining the disk in a predetermined position, means for disengaging said last-named means, and means simultaneously actuated with said third-named means for rendering inoperative said means for driving the belt.

5. In an indicator, a pair of spools having a belt mounted thereon, a connection between the spools, a disk with means for actuating the same, a connection between said disk and said connection of the spools, means for retaining the disk in a predetermined position, and means for simultaneously disengaging said last-named means, and said connection between the connection of the spools and the driving means of the disk.

6. In an indicator, a belt with means for driving the belt, means for retaining the belt in a predetermined position, means for simultaneously releasing said retaining means and actuating the belt after the releasing of said retaining means, means for simultaneously rendering said retaining means inoperative and for rendering inoperative said driving means, and means for releasing said means for rendering inoperative said retaining means upon completion of the reversal of the belt movement.

7. In an indicator, a pair of spools having a belt thereon, a disk, means for retaining the disk in a predetermined position, a connection between the spools, means actuating the said disk and driving said connection and means for rendering said last-named means inoperative and simultaneously releasing said means for retaining the disk in its predetermined position.

8. In an indicator, a belt with driving means therefor, means for retaining the belt in a predetermined position, and means for simultaneously disengaging said driving means and for disengaging said retaining means.

9. In an indicator, a belt, a toothed disk, and means for actuating said disk, spools for mounting the belt having a connection therebetween, means whereby said connection may be actuated, a slidable connection between said last-named means and the means for driving the disk, means for actuating said slidable connection whereby movement of the belt may be reversed and means for retaining the disk in a predetermined position.

10. In an indicator a belt with means for driving the belt, means for retaining the belt in a predetermined position, manually-operated means for simultaneously disengaging said actuating means and rendering inoperative said retaining means, and means for releasing said means for disengaging the actuating means and for rendering inoperative the retaining means upon complete reversal of the belt.

11. In an indicator, the combination with a casing having a sight-opening, part of which casing is removable, of an apron or belt mounted on reels adapted to be removed from said casing, a support for said apron or belt secured on said removable portion, a driving-spring for actuating said apron or belt, a motor for keeping said spring under constant tension, gearing whereby the direction of movement of the belt may be reversed, a toothed disk geared to said driving means, a dog for normally holding the disk in a stationary position, thereby preventing the movement of said driving means, electrical means for intermittently removing said dog from said disk for the purpose of permitting the driving-spring to operate, and means whereby the belt or apron may be rewound at any point during its travel, substantially as described.

12. In an indicator, the combination with a casing, part of which is removable, of a cover secured thereon having a sight-opening, removable rolls mounted on said portion, a belt or apron running and wound around said rolls, a support for said apron carried by said removable portion, spring driving means adapted to actuate said rolls when same are in place in said casing, a motor for winding said spring driving means, a notched disk connected by gearing to said driving means, a dog adapted to engage said notched disk, thereby preventing the operation of said driving means, electrical means whereby said dog is disengaged from said disk, thereby permitting the operating means to drive the belt, means for disconnecting the driving means from the rolls and the dog from the disk whereby the parts may be restored to their normal position at any time during the travel of the belt, means whereby when the notched disk is returned to its starting-point, the said dog will again engage the disk and the gearing be again connected, and means whereby the direction of movement of said belt or apron may be reversed, and means for normally holding the dog in engagement with said disk, substantially as described.

13. In an indicator, the combination with a casing, part of which is removable, of a cover for the same provided with a sight-opening, means for securing said removable portion to the casing, reels carried by said removable portion, a belt or apron provided with names adapted to successively appear at the sight-opening secured and wound on said reels, a support secured to said removable portion adapted to support the said apron between the reels, a spiral spring for driving said reels, gearing whereby the said reels are connected with said driving-spring when the removable portion is connected to the casing, gearing whereby the direction of movement of said belt may be reversed, means for maintaining the drive-spring under constant tension, a notched disk connected with said driving means by suitable gearing, a dog adapted to normally engage the notches of said disk thereby preventing the driving mechanism from operating, electrical means for removing said dog from said disk, means whereby said dog may be mechanically removed from said disk, when the drive-gearing of the rolls is disengaged from the drive-spring, means whereby the said dog and gearing are again restored to their normal position when the notched disk has reached a predetermined point, and means whereby the actuation of the indicator may become known to the attendant.

14. In an indicator, a belt, a toothed disk, means for driving the disk, means for retaining the disk in a predetermined position, means for simultaneously rendering inoperative the driving means and the means for retaining the belt in predetermined position, and means on the disk for releasing said means for disengaging the driving means and the retaining means, upon a complete revolution of said disk.

15. In an indicator, a belt mounted on spools, a connection between said spools whereby the same will be simultaneously operated, a disk, and means for retaining the same in a predetermined position, means for driving the disk, means connected to said connection of the spools for operating the same, and a slidable connection between said last-named means and the driving means of the disk, manually-operated means for actuating said sliding connection.

16. In an indicator, a belt, means for operating the belt, a disk with means for retaining the disk in predetermined position, means for actuating the belt and disk simultaneously, means whereby said means may be disconnected to permit the independent movement of the belt with respect to the disk, and means for rendering inoperative said disk-retaining means.

17. In an indicator, a belt, and a disk, with means for simultaneously actuating the same, means whereby said means may be disconnected to permit independent movement of the belt with respect to the disk, means for retaining the belt in predetermined position, and means for simultaneously actuating said last-named means and the means for permitting independent movement of the belt.

18. In an indicator, a belt and a disk, means for operating the belt and disk simultaneously, means whereby said means may be disconnected to permit independent movement of the belt, means for retaining the disk in predetermined position, and manually-operated means for rendering inoperative said disk-retaining means to permit independent movement of the belt.

19. In an indicator, a belt and a disk, devices for operating each, a connection between the devices whereby they may be simultaneously operated, means for retaining the disk in predetermined position, and means for simultaneously rendering said means inoperative and actuating the said connection so as to permit independent movement of the belt.

In testimony whereof we affix our signatures in the presence of two witnesses.

CHARLES E. HAWKINS.
FRANK CARY.

Witnesses:
A. M. WILSON,
E. E. POTTER.